(12) United States Patent
Kimura

(10) Patent No.: US 10,955,822 B2
(45) Date of Patent: Mar. 23, 2021

(54) TOILET SYSTEM, TOILET MANAGEMENT METHOD, AND RECORDING MEDIUM

(71) Applicant: KIMURA CORPORATION, Tokyo (JP)

(72) Inventor: Tomoei Kimura, Tokyo (JP)

(73) Assignee: KIMURA CORPORATION, Tokyo (JP)

( * ) Notice: Subject to any disclaimer, the term of this patent is extended or adjusted under 35 U.S.C. 154(b) by 4 days.

(21) Appl. No.: 16/339,870

(22) PCT Filed: Oct. 6, 2017

(86) PCT No.: PCT/JP2017/036481
§ 371 (c)(1),
(2) Date: Apr. 5, 2019

(87) PCT Pub. No.: WO2018/066694
PCT Pub. Date: Apr. 12, 2018

(65) Prior Publication Data
US 2019/0243342 A1 Aug. 8, 2019

(30) Foreign Application Priority Data

Oct. 7, 2016 (JP) .............................. JP2016-199451

(51) Int. Cl.
*G05B 19/4155* (2006.01)

(52) U.S. Cl.
CPC ..................... *G05B 19/4155* (2013.01); *G05B 2219/40062* (2013.01)

(58) Field of Classification Search
CPC . E03D 11/00; G05B 19/4155; G07C 9/00174; G08B 21/02; G08B 21/04
See application file for complete search history.

(56) References Cited

U.S. PATENT DOCUMENTS

2011/0316703 A1* 12/2011 Butler .................. G08B 21/245
340/573.1
2019/0147719 A1* 5/2019 Landwehr .............. G08B 21/02
340/517

FOREIGN PATENT DOCUMENTS

| JP | 2002-188204 | 7/2002 |
| JP | 2007-058406 | 3/2007 |
| JP | 2007-241446 | 9/2007 |
| JP | 4991771 B2 | 8/2012 |

(Continued)

OTHER PUBLICATIONS

International Search Report for PCT/JP2017/036481 dated Dec. 26, 2017 in 3 pages.

(Continued)

*Primary Examiner* — Mark A Connolly
(74) *Attorney, Agent, or Firm* — Knobbe, Martens, Olson & Bear LLP

(57) ABSTRACT

Provided is a technique for controlling a door of a toilet cubicle according to a situation in the toilet cubicle at the time of an abnormality occurrence. A toilet system according to the present invention is provided with a detection unit that detects a state of the inside of a toilet cubicle, an abnormality determination unit that determines the occurrence of an abnormality and the type thereof on the basis of a detection result obtained by the detection unit, and a door control unit that controls opening and closing of a door according to the type of the abnormality when it is determined that the abnormality has occurred.

18 Claims, 11 Drawing Sheets

(56) References Cited

FOREIGN PATENT DOCUMENTS

| JP | 2015-087882 | 5/2015 |
|---|---|---|
| WO | WO 99/28880 A2 | 6/1999 |
| WO | WO 01/24133 A1 | 4/2001 |

OTHER PUBLICATIONS

International Preliminary Report on Patentability for PCT/JP2017/036481 dated Apr. 18, 2019 in 6 pages.
Extended European Search Report issued in European patent application No. 17858530.3 dated May 25, 2020.

\* cited by examiner

PLAN VIEW

PLAN VIEW

ELEVATIONAL VIEW

PLAN VIEW

ELEVATIONAL VIEW

TOILET SYSTEM, TOILET MANAGEMENT METHOD, AND RECORDING MEDIUM

CROSS-REFERENCE TO RELATED APPLICATION

This application is a U.S. national phase of International Patent Application No. PCT/JP2017/036481 filed on Oct. 6, 2017, which claims the benefit of Japanese Patent Application No. 2016-199451 filed on Oct. 7, 2016, the entire contents of each of which are incorporated herein by reference.

FIELD

The present invention relates to a toilet system, a toilet management method, and a toilet management program.

BACKGROUND ART

Conventionally, a system is known that issues an alarm when a user of a toilet stays in the toilet for a long time such as thirty minutes or more because there is a possibility that the user is in poor physical condition or is an unlawful intruder.

CITATION LIST

[Patent Document]
Patent document 1: Japanese Patent Laid-Open No. 2007-58406
Patent document 2: Japanese Patent Laid-Open No. 2007-241446
Patent document 3: Japanese Patent No. 4991771

SUMMARY OF THE INVENTION

Problems to be Solved by the Invention

In the conventional system, an alarm is issued in a same manner for a case where the user is in a poor physical condition and for a case where the user is an unlawful intruder. Thus, a manager going to the toilet in response to the alarm grasps the situation after arriving at the toilet, and takes corresponding actions such as opening the door and aiding the user of the toilet when the user is in a poor physical condition and capturing the intruder when the user is an unlawful intruder.

The door of a toilet cubicle is often locked when the user is in a poor physical condition and cannot move, which is an obstruction for giving a prompt aid.

In the meantime, in the case of an unlawful intruder, it is desirable for the door of the toilet cubicle to be locked until the manager arrives in order to capture the intruder.

It is therefore an object of the present invention to provide a technique capable of controlling a door of a toilet cubicle in accordance with the situation in the toilet cubicle under occurrence of abnormality.

Means for Solving the Problems

In order to overcome the issues mentioned above, the toilet system according to the present invention includes: a detection unit that detects a state inside a toilet cubicle; an abnormality determination unit that determines occurrence of abnormality and a type thereof based on a detection result of the detection unit; and a door control unit that controls opening and closing of a door in accordance with the type of abnormality when the occurrence of the abnormality is determined.

Thereby, the toilet system according to the present invention is capable of controlling the door of the toilet cubicle according to the situation inside the toilet cubicle under occurrence of the abnormality.

In order to overcome the issues mentioned above, in the toilet system according to the present invention: the detection unit detects a state of a user in the toilet cubicle based on at least one selected from position, shift, and shape of an article in the toilet cubicle; the abnormality determination unit determines that there is occurrence of the abnormality when the state of the user satisfies a first condition; and the door control unit performs a control to open the door.

This makes it possible to perform a control to open the door in a situation where abnormality occurs and it is desired to promptly aid the user inside the toilet cubicle.

In the toilet system, the first condition may be defined that a maximum value of height of the user detected by the detection unit is a prescribed lower limit value or less or that the user has been still for a prescribed time or more.

This makes it possible to perform a control to open the door promptly in a situation where the user is fallen down inside the toilet cubicle.

In the toilet system, the detection unit may detect a state of a user in the toilet cubicle based on at least one selected from position, shift, and shape of an article in the toilet cubicle; the abnormality determination unit may determine that there is occurrence of the abnormality when the state of the user satisfies a second condition; and the door control unit may keep the door in a closed state.

This makes it possible to perform a control to keep the door in a closed state in a situation where abnormality occurs and it is desired to make the user stay inside the toilet cubicle.

In the toilet system, the second condition may be defined that the user is present over a prescribed upper limit value, that shape of toilet equipment provided in the toilet cubicle is changed by the user, or that a specific action toward the toilet equipment is conducted by the user.

This makes it possible to perform a control to keep the door in a closed state for making the user stay in the toilet cubicle when secret photographing or destruction of the toilet equipment occurs.

In the toilet system: the detection unit may detect entry or leaving of the user to/from the toilet cubicle; the abnormality determination unit may determine that there is occurrence of the abnormality when it is found by comparing inside of the toilet cubicle before the user enters and inside of the toilet cubicle after the user leaves that an article that was not present in the toilet cubicle before the entry is present in the toilet cubicle after the leaving; and the door control unit may perform a control to close the door.

This makes it possible to perform a control to close the door when there is a remaining article present in the toilet cubicle.

In order to overcome the issues mentioned above, in the toilet management method according to the present invention, a computer executes: a detection step of detecting a state inside a toilet cubicle; an abnormality determination step of determining occurrence of abnormality and a type thereof based on a detection result of the detection step; and a door control step of controlling opening and closing of a door in accordance with the type of abnormality when the occurrence of the abnormality is determined.

This makes it possible to perform a control to open the door in a situation where abnormality occurs and it is desired to promptly aid the user inside the toilet cubicle.

In the toilet management method, the first condition may be defined that a maximum value of height of the user detected by the detection unit is a prescribed lower limit value or less or that the user has been still for a prescribed time or more.

In the toilet management method, the detection unit may detect a state of a user in the toilet cubicle based on at least one selected from position, shift, and shape of an article in the toilet cubicle; the abnormality determination unit may determine that there is occurrence of the abnormality when the state of the user satisfies a prescribed second condition; and the door control unit may keep the door in a closed state.

In the toilet management method, the second condition may be defined that the user is present over a prescribed upper limit value, that shape of toilet equipment provided in the toilet cubicle is changed by the user, or that a specific action toward the toilet equipment is conducted by the user.

In the toilet management method, the detection unit may detect entry or leaving of the user to/from the toilet cubicle; the abnormality determination unit may determine that there is occurrence of the abnormality when it is found by comparing inside of the toilet cubicle before the user enters and inside of the toilet cubicle after the user leaves that an article that was not present in the toilet cubicle before the entry is present in the toilet cubicle after the leaving; and the door control unit may perform a control to close the door.

Further, the present invention may be a toilet management program causing the computer to execute the toilet management method.

Effects of the Invention

With the present invention, it is possible to provide a technique capable of controlling the door of the toilet cubicle in accordance with the situation inside the toilet cubicle under occurrence of abnormality.

MODE FOR CARRYING OUT THE INVENTION

First Embodiment

Hereinafter, an embodiment of the present invention will be described with reference to the accompanying drawings. Note that the embodiment is illustrative only, and the configuration of the present invention is not limited to following examples.

Figure 1:
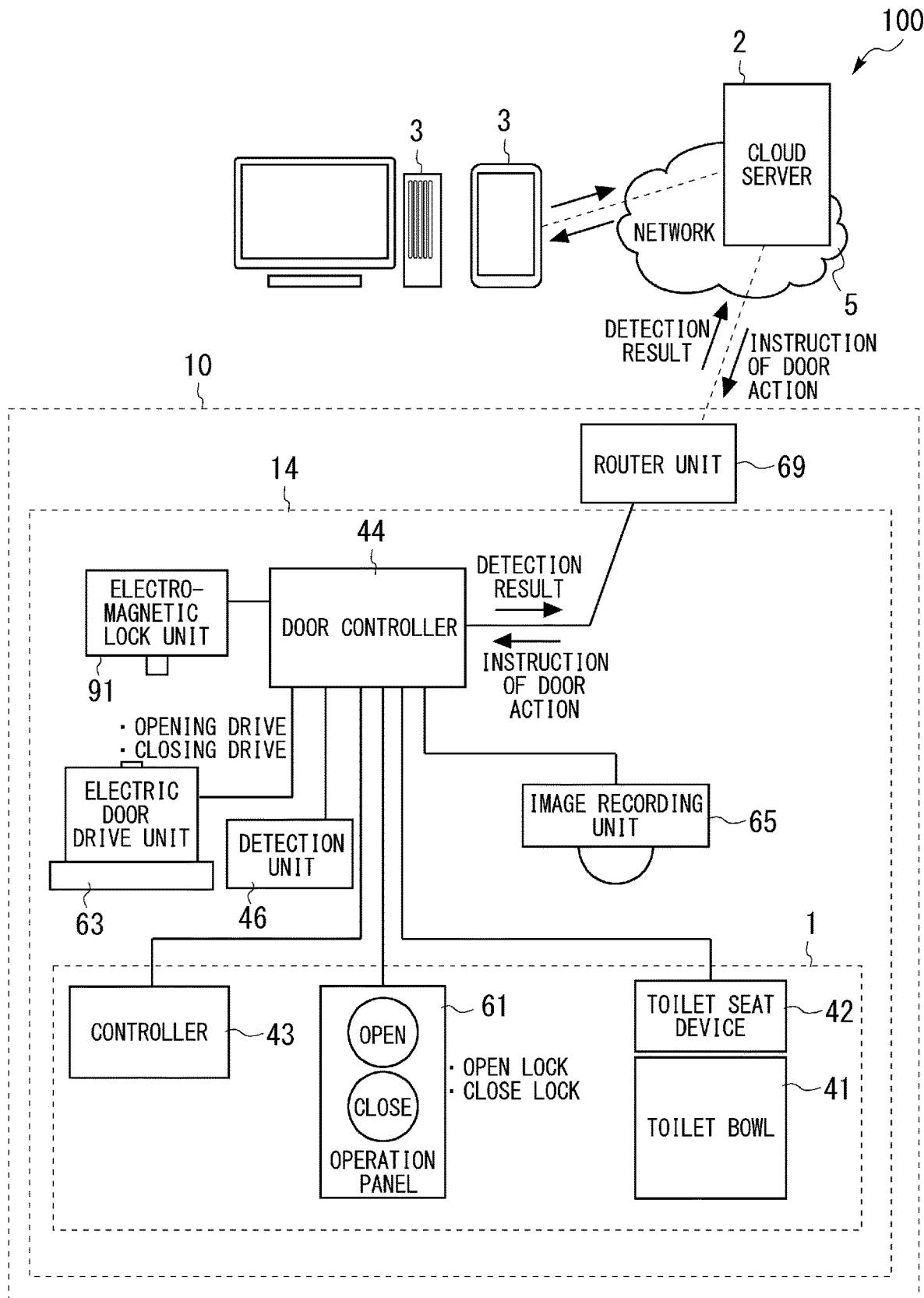
FIG. 1 is a diagram illustrating a configuration of a whole toilet system.

FIG. 1 is a diagram illustrating the configuration of a whole toilet system according to the first embodiment. A toilet system 100 according to the embodiment includes a toilet facility 10 and a management server 2, which are connected mutually via a network 5 such as the Internet. In the toilet system 100, toilet equipment 1 detects a state inside a toilet cubicle 14 provided in the toilet facility 10, and notifies the management server 2. When it is determined that a user is staying inside the toilet cubicle 14 for a prescribed time or more, the management server 2 transmits an alarm to a manager terminal 3 or the like and controls the door of the toilet cubicle 14. While FIG. 1 illustrates an example where the toilet system 100 does not include the manager terminal 3, the toilet system 100 may include the manager terminal 3.

The toilet facility 10 means the toilets used by the public placed at commercial facilities such as department stores, stations, and the like. The toilet facility 10 is provided in each of a plurality of buildings or on each of a plurality of floors of the buildings, for example. Further, the toilet facility 10 detects the state inside the toilet cubicle by a control device 44 provided in the toilet cubicle 14, and regularly transmits the state to the management server 2 as use information.

The management server 2 receives the user information from the toilet equipment 1, and performs processing for outputting a preliminary warning to the user inside the toilet cubicle 14 or processing for transmitting an alarm to the manager, for example, based on the user information.

Figure 2:
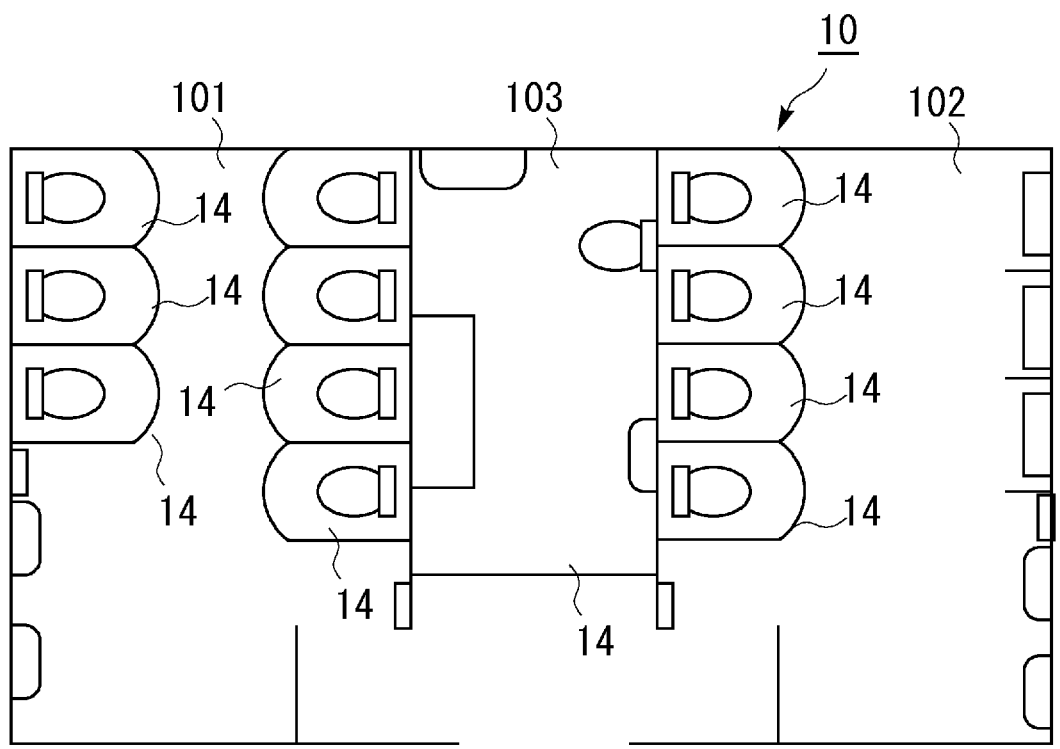
FIG. 2 is a diagram illustrating an example of a toilet facility.
Figure 3:
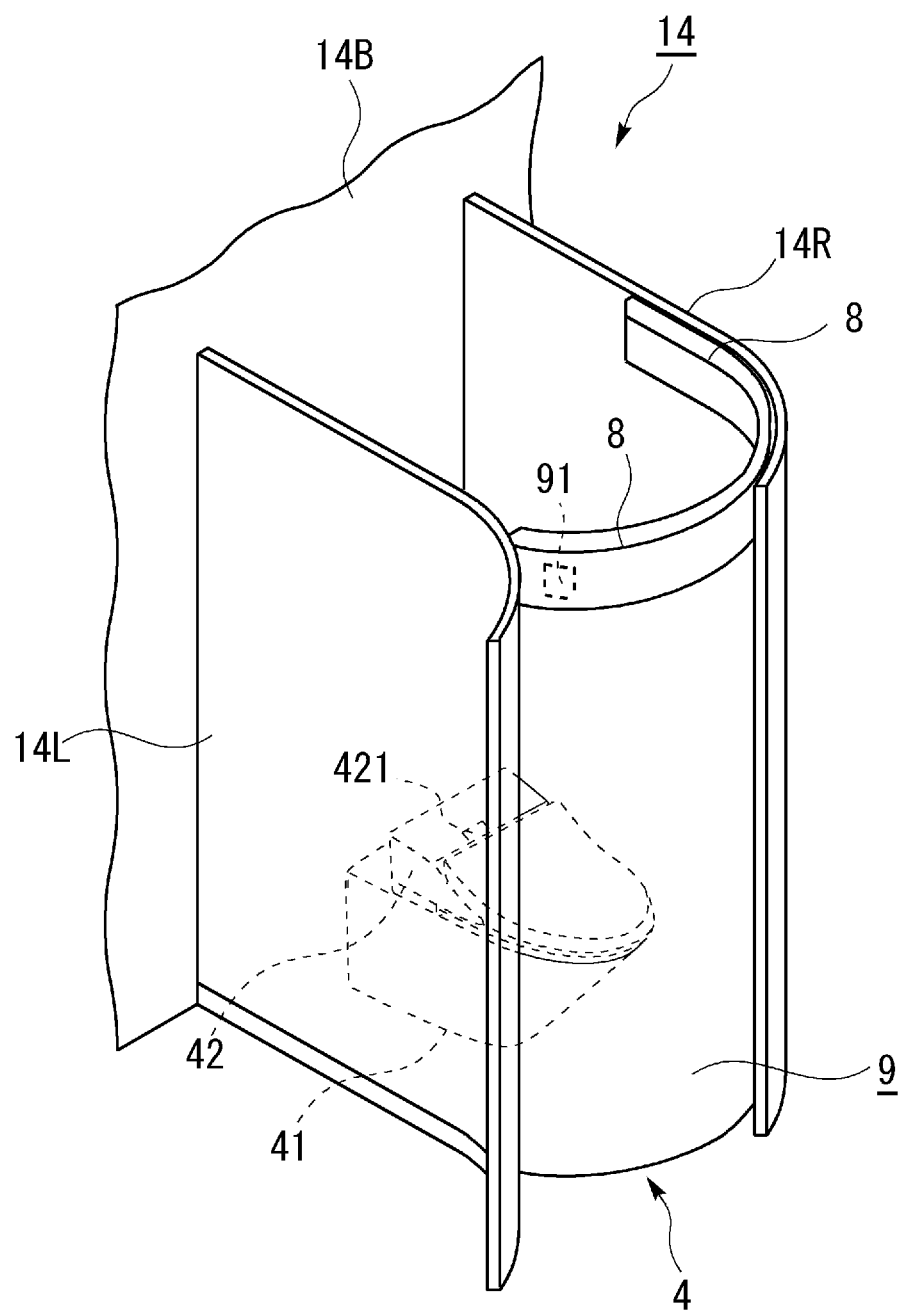
FIG. 3 is a perspective view illustrating a toilet cubicle.
Figure 4:
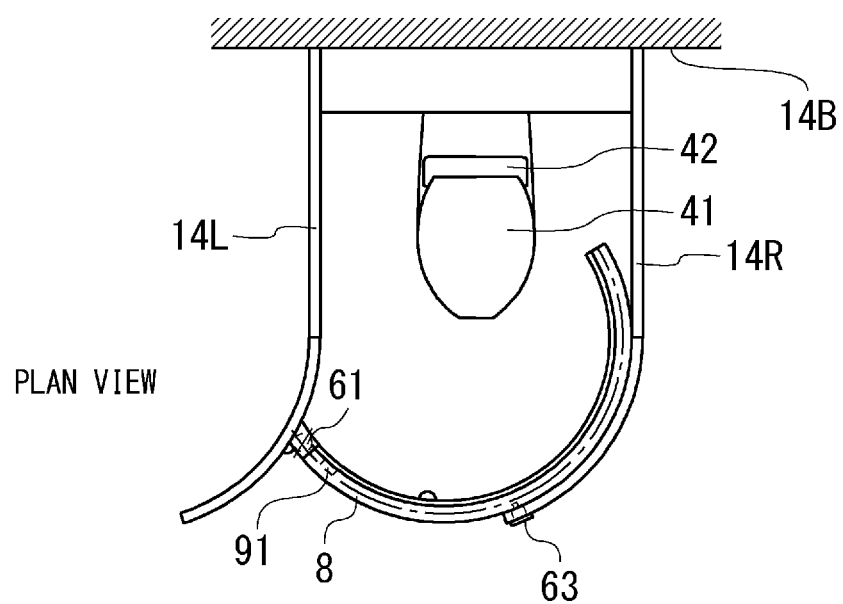
FIG. 4 is a plan view illustrating the toilet cubicle.
Figure 5:
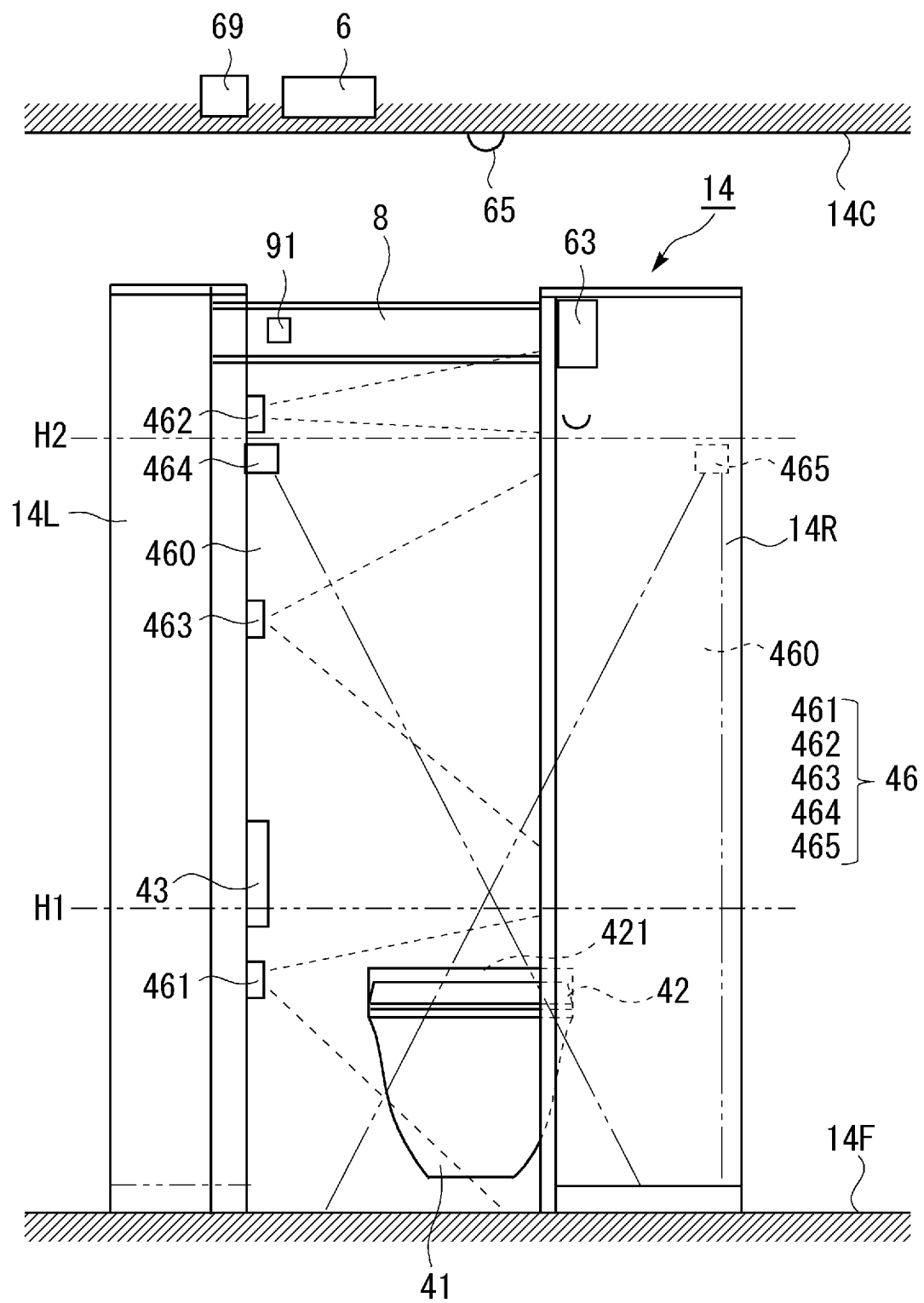
FIG. 5 is an elevational view illustrating the toilet cubicle.
Figure 6A:
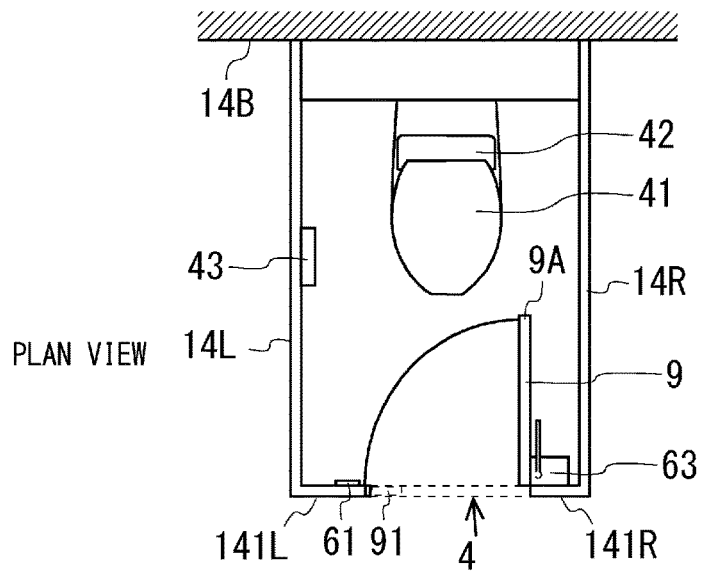
FIG. 6A and FIG. 6B are views illustrating a toilet cubicle with a hinged door.
Figure 6B:
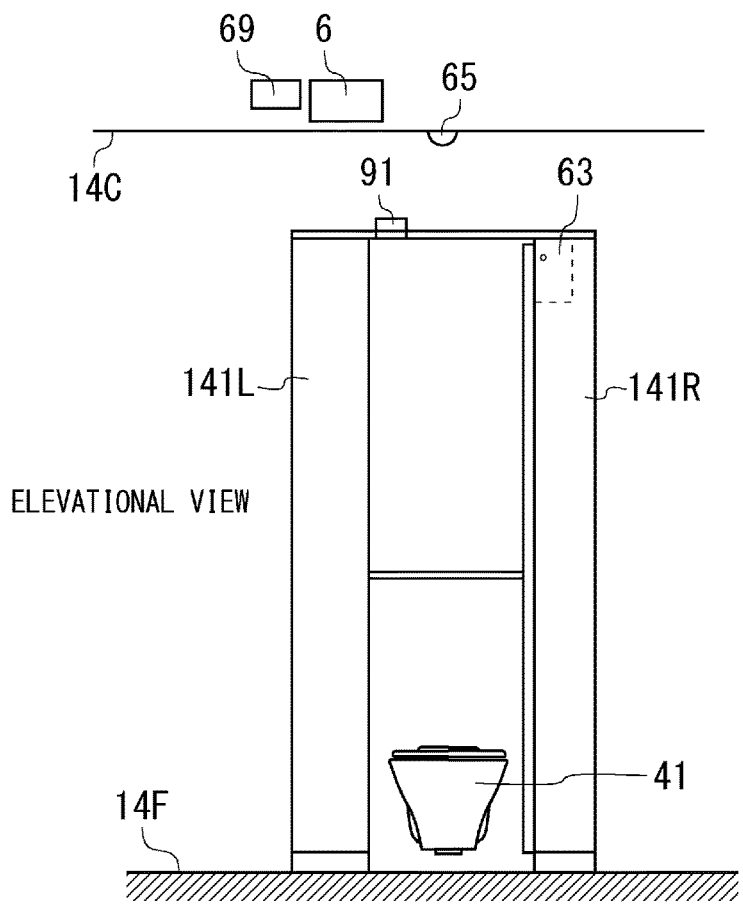
Figure 7A:
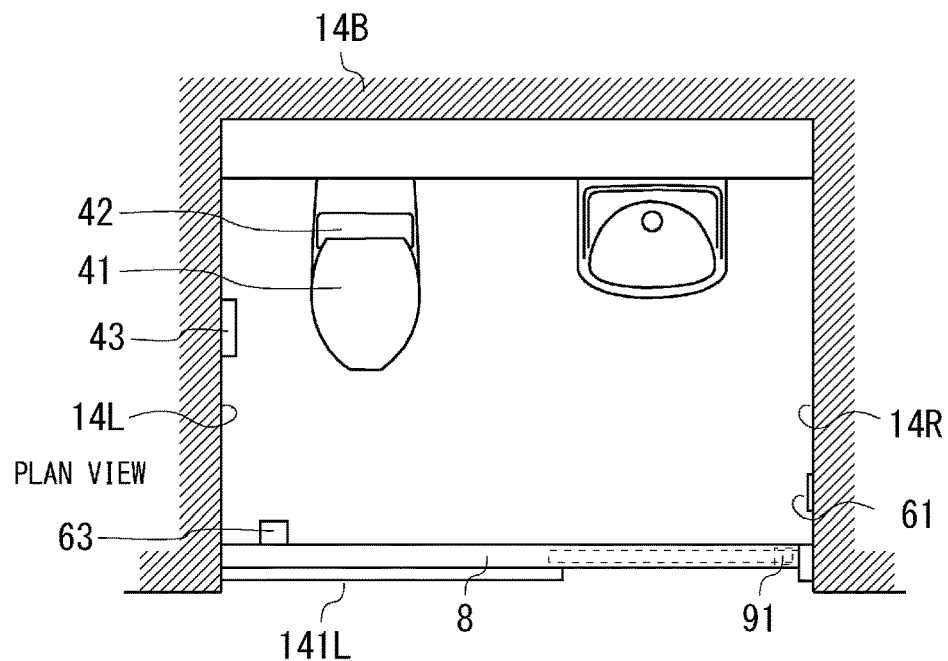
FIG. 7A and FIG. 7B are views illustrating a toilet cubicle with a sliding door.
Figure 7B:
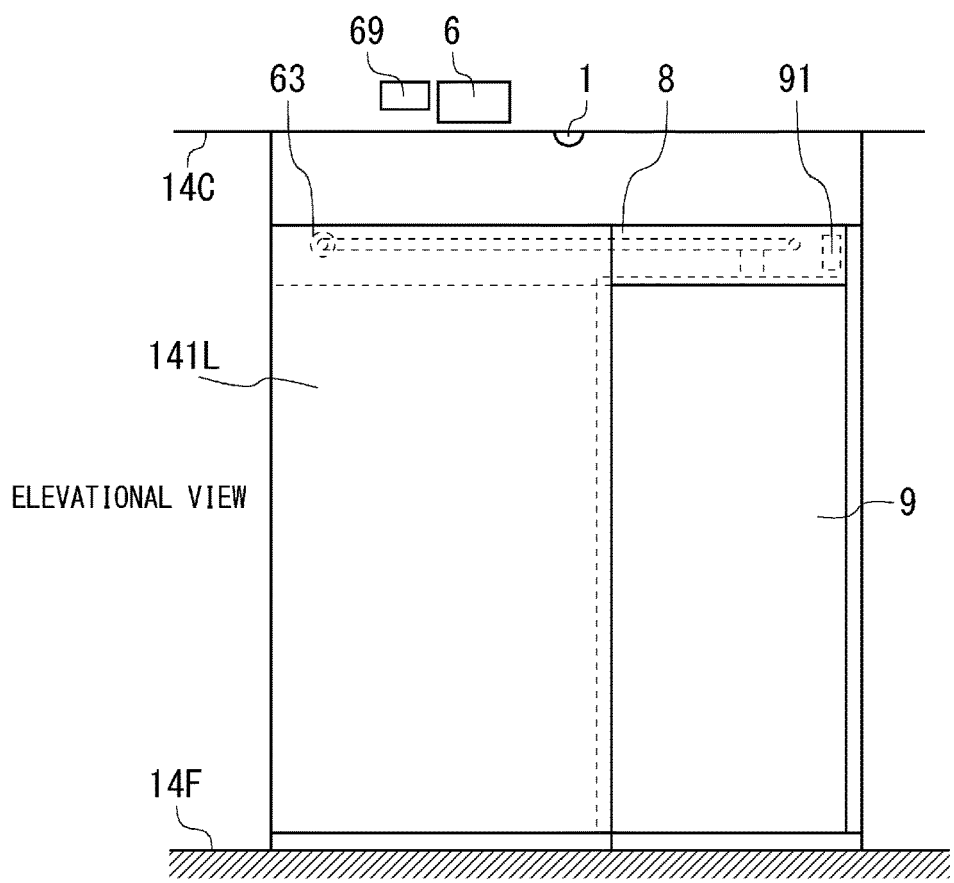

FIG. 2 is a diagram illustrating an example of the toilet facility 10, FIG. 3 is a perspective view illustrating the toilet cubicle 14 provided in the toilet facility 10, FIG. 4 is a plan view illustrating the toilet cubicle 14, FIG. 5 is an elevational view illustrating the toilet cubicle 14, FIG. 6A and FIG. 6B are views illustrating the toilet cubicle 14 with a door 9 being a hinged door, and FIG. 7A and FIG. 7B are views illustrating the toilet cubicle 14 with the door 9 being a sliding door.

As shown in FIG. 2, the toilet facility 10 is sectioned into a ladies' toilet facility 101, a men's toilet facility 102, and a multipurpose toilet 103. A plurality toilet cubicles 14 are provided in the ladies' toilet facility 101 and the men's toilet facility 102. While FIG. 2 illustrates an example where the multipurpose toilet 103 is provided with a single toilet cubicle 14, the multipurpose toilet 103 may also include a plurality of toilet cubicles 14. Note here that the toilet cubicle 14 is a space surrounded by a door, walls, and the like including the toilet equipment 1 normally used by a single person at one time. Note that the toilet cubicle 14 is not strictly limited to be used by a single person but may be a type to which a helper or an infant can enter simultaneously with the user.

The toilet cubicle 14 includes a pair of left and right sidewalls 14L, 14R as well as a back wall 14B, and the door 9 for opening and closing a doorway 4 of the toilet cubicle 14. A toilet bowl 41 is placed inside the toilet cubicle 14 surrounded on all sides by the sidewalls 14L, 14R, the back wall 14B, and the door 9. The sidewalls 14L, 14R, the back wall 14B, and the door 9 surrounding the toilet cubicle 14 may be in height reaching a ceiling 14C from a floor 14F. In the present embodiment, however, there is a space provided between the left and right sidewalls 14L, 14R, the door 9 and the ceiling 14C as illustrated in FIG. 5 for allowing circulation of the air.

Note here that the left and right means the left side and right side when facing forward to the doorway 4 from the outside of the toilet, front and back means the front side and back side when sitting on the toilet bowl 41, and upper and lower means the ceiling 14C side and the placement face (floor) 14F side of the toilet bowl 41.

The left and right sidewalls 14L and 14R are plate members formed to be in J-like shape in lateral section, i.e., to be in a shape where one side is in a straight-line form while the other side is in a curved form (secondary curvature) (see FIG. 2 and FIG. 3). When there are neighboring toilet cubicles 14, the left sidewall 14L also functions as the right sidewall 14R of another neighboring toilet cubicle 14 on the left, and the right sidewall 14R also functions as the left sidewall 14L of yet another neighboring toilet cubicle 14 on the right of the toilet cubicle 14.

A guiderail 8 is placed on an inner upper part of the right sidewall 14R (see FIG. 3). The guiderail 8 with one end part being held to the right sidewall 14R is placed through the upper part of the doorway 4 while another end being fixed to the left sidewall 14L. Although not illustrated in FIG. 3, the guiderail 8 is also placed inside the toilet cubicle on the left sidewall 14L functioning as the right sidewall 14R of the neighboring toilet cubicle 14 on the left. Further, a door drive unit 63 is placed in the vicinity of the guiderail 8 at a front-end upper part of the right sidewall 14R. The door 9 is placed by being hung from the guiderail 8, and the door 9 is moved by the door drive unit 63 along the guiderail 8 to open/close the doorway 4. Further, a lock 91 is provided to the guiderail 8, locking up/unlocking of the lock 91 is controlled in accordance with the drive of the door 9 by the door drive unit 63.

At the inside face of a left-side end part of the door 9, placed is an operation panel 61 that includes open and close buttons of the door 9 and electrically connected to the door drive unit 63. When the close button of the operation panel 61 is pressed by an operation of a user, the door drive unit 63 drives the door 9 to be closed and engage the lock 91 with the door 9 for locking up in a state where the left end of the door 9 is being abutted against the left sidewall 14L to prevent the door from opening. Then, when the open button of the operation panel 61 is pressed, the door drive unit 63 drives the lock 91 to release the engagement with the door 9 for unlocking, and drives the door 9 in an opening direction. The lock 91 is not limited to be in a configuration that is provided to the guiderail 8 and engaged with the door 9 but may also be in a configuration that is provided on the left sidewall 14L, the right sidewall 14R, the floor 14F, or the like and engaged with the door 9 to prevent the door from opening. Inversely, the lock 91 may be in a configuration that is provided to the door 9 and engaged with the guiderail 8, the left sidewall 14L, the right sidewall 14R, the floor 14F, or the like to prevent the door from opening. In the present example, when the door 9 is closed, the lock 91 is designed to be locked up so that the door 9 is not opened. However, the lock 91 may be omitted when employing a configuration with which the closed door 9 is not easily opened, e.g., a configuration with which a gear of the door drive unit 63 does not rotate and the door 9 does not move even when others put a force to open the door 9 manually.

While the example of the toilet cubicle using the rotary door 9 is illustrated in FIG. 3 to FIG. 5, the toilet cubicle is not limited to such configuration but may also be a configuration where the door is a hinged door as illustrated in FIG. 6A and FIG. 6B or a configuration where the door 9 is a slide door as illustrated in FIG. 7A and FIG. 7B.

The toilet cubicle 14 illustrated in FIG. 6A and FIG. 6B is surrounded on three sides by the pair of left and right sidewalls 14L, 14R and the back wall 14B, a left front wall 141L is provided on the left side of the front face of the toilet cubicle 14, a right front wall 141R is provided on the right side of the front face, and an opening between the left front wall 141L and the right front wall 141R is the doorway 4. Further, at a left end of the right front wall 141R, the door 9 is attached in a swingable manner via hinges (not illustrated). The door drive unit 63 is provided on a hinge-side upper part of the door 9, and the door 9 is driven to open/close by the door drive unit 63. For example, the door drive unit 63 rotates a door end 9A of the door 9 to the inner side with the hinge being a center axis to open the doorway 4, and rotates inversely until the door end 9A is caught at a right end of the left front wall 141L to be in a closed state.

On the inner side of the left front wall 141L, the operation panel 61 for operating opening and closing by the door drive unit 63 is provided.

Further, an upper frame 142 is placed over an upper end of the left front wall 141L and an upper end of the right front wall 141R, and the lock 91 is provided at the upper frame 142. The lock 91 is driven by the door drive unit 63 in accordance with opening and closing of the door 9 and, when the door 9 is closed, engaged with the door 9 and locked up to prevent the door from opening.

The toilet cubicle 14 illustrated in FIG. 7A and FIG. 7B is surrounded on three sides by the left sidewall 14L, the right sidewall 14R, and the back wall 14B, the front wall 141L is provided on the left side of the front face of the toilet cubicle 14, and an opening between the left front wall 141L and a front end of the right sidewall 14R is the doorway 4. The guiderail 8 is provided on the upper part of the left front wall 141L and the right sidewall 14R, and the door drive unit 63 is provided along the guiderail 8. The door 9 is placed by being hung from the guiderail 8, and the door 9 is moved by the door drive unit 63 along the guiderail 8 to open and close the doorway 4. Further, the lock 91 is provided to the guiderail 8, locking up/unlocking of the lock 91 is controlled in accordance with the drive of the door 9 by the door drive unit 63. For example, when the door 9 is closed, the lock 91 is engaged with the door 9 and locked up to prevent the door from opening.

In the vicinity of the door 9 on the right sidewall 14R, the operation panel 61 for operating opening and closing by the door drive unit 63 is provided.

Returning to FIG. 1, provided in the toilet cubicle 14 are the toilet equipment 1 such as the toilet bowl 41, a toilet seat device 42, a controller 43, the operation panel 61, as well as the control device 44, a detection unit 46, and an image recording unit 65.

The toilet equipment 1 is disposed inside the toilet cubicle and directly used mainly by the user. Further, the toilet equipment 1 may include the walls 14L, 14R, 14B, as well as the floor 14F of the toilet cubicle, a shelf, a paper holder, and the like. Also, the toilet equipment 1 may be those that can be touched by the user by being placed inside the toilet cubicle.

The image recording unit 65 includes a camera that captures images inside the toilet cubicle and a memory for recording the captured images.

The toilet seat device 42 is provided on the Western-style toilet bowl 41, and has a function of heating an S-seat surface where the user sits and a washing function of washing the anus and private part of the user by discharging warm water. Further, the toilet seat device 42 includes a seat sensor 421 that detects whether the user is sitting. Based on a detection result of the seat sensor 421, the toilet seat device 42 performs a control to discharge washing water for washing the toilet seat when sitting is no longer detected after a prescribed time has passed from detection of sitting of the user, i.e., when it is determined that the user has finished using the toilet and stood up, and a control to be in a power saving mode by lowering the temperature of the seating surface when the user is not sitting, for example. Note that the toilet bowl 41 is not limited to a Western style but may also be a Japanese style, and the toilet seat device 42 is omitted in a case where the Japanese-style toilet bowl 41 is provided.

Figure 8:
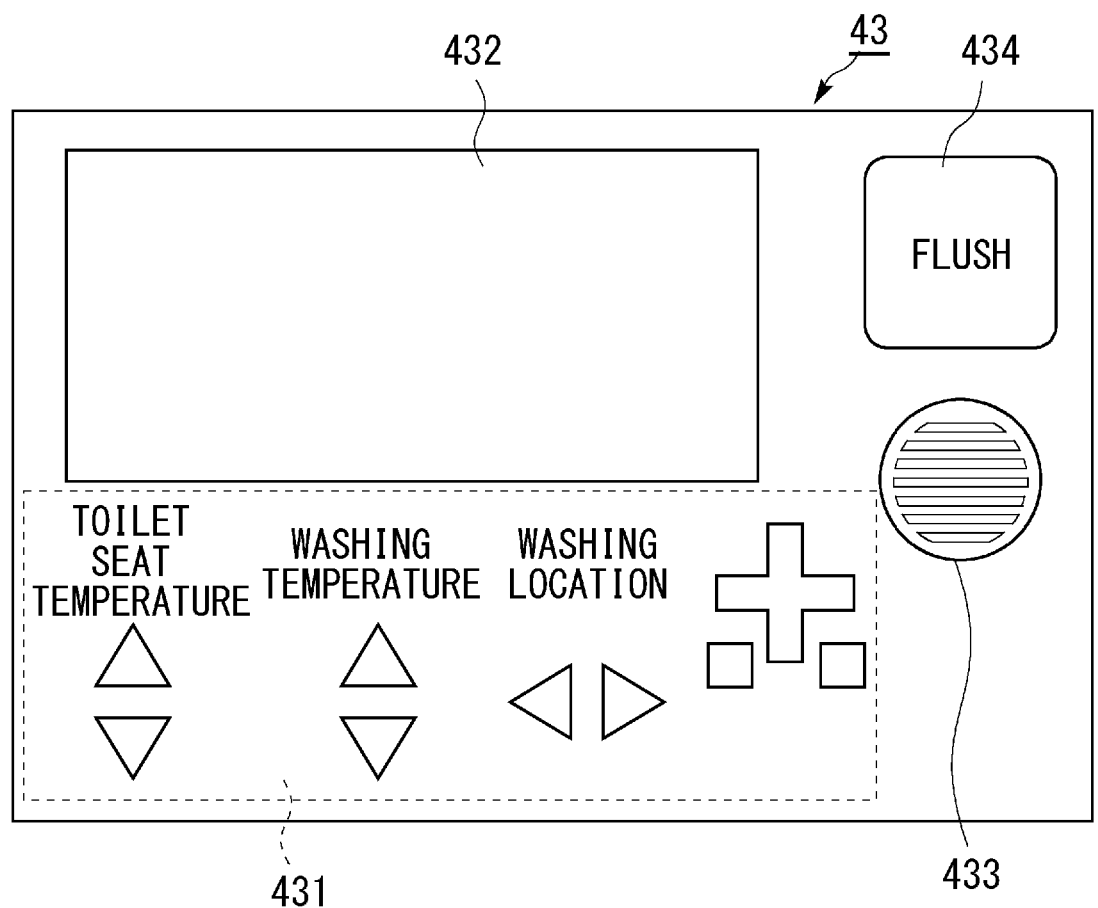
FIG. 8 is a view illustrating an example of a controller.

As shown in FIG. 8, the controller 43 includes an operation unit 431 that performs operations such as setting of the temperature of the toilet seat device 42, setting of washing positions, and the like. Further, the controller 43 includes a display unit 432 and a speaker 433.

The display unit 432 displays information and the like received from the control device 44 in addition to the set temperature of the toilet seat, the temperature of the warm water used for washing, and the washing position.

The speaker 433 outputs an operation sound when the operation unit 431 is operated, a sound related to a preliminary warning to be described later, an imitative sound or the like imitating flushing sound of washing water that washes the toilet bowl.

The detection unit 46 is a sensor for detecting positions, movements (motions), and shapes of articles within the toilet cubicle. The detection unit 46 is a human-motion sensor for detecting presence of the user by infrared rays, radio waves, ultrasonic waves, or the like, for example. The detection unit 46 may be a passive sensor that detects presence of the user by sensing the infrared rays emitted from the user or may be an active sensor that transmits infrared rays, radio waves, or ultrasonic waves from a transmitter and, when there is a change in the infrared rays, radio waves, or the ultrasonic waves by being blocked or reflected by the user, detects presence of the user through capturing the change by a receiver. In the present embodiment, there are a plurality of human-motion sensors provided for different positions as detection target areas, and the position of the present user is identified depending on which of the human-motion sensors the change is detected. For example, as shown in FIG. 5, provided are a sensor 461 directed for a detection target area of lower limit height H1 or lower, a sensor 462 directed for a detection target area of upper limit height H2 or higher, and a sensor 463 directed for a detection target area between the lower limit height H1 and the upper limit height H2. Further, the detection unit 46 may detect the motion of the user based on intensities of the infrared rays, radio waves, or the ultrasonic waves to be received and changes in the phase. Furthermore, sensors of other apparatuses may be used for the detection unit 46. For example, the seat sensor 421 of the toilet seat device 42 and a sensor (not illustrated) for activating lighting, air conditioning, deodorizer, and the like by detecting that the user has entered the toilet cubicle 14 may be used as the detection unit 46. Further, the operation panel 61 or the door drive unit 63 may be used as the detection unit 46 to acquire the opening and closing state of the door 9.

Further, the detection unit 46 may include a ToF (Time of Flight) distance image sensor and a three-dimensional scanner (laser scanner) for mainly detecting the shapes of the articles in the toilet cubicle. The ToF distance image sensor and the three-dimensional scanner may detect the position and the shape of the article in a prescribed period, and acquire changes in the position and shape of the article over time as the shift and motion of the article based on the detection result.

Figure 9:
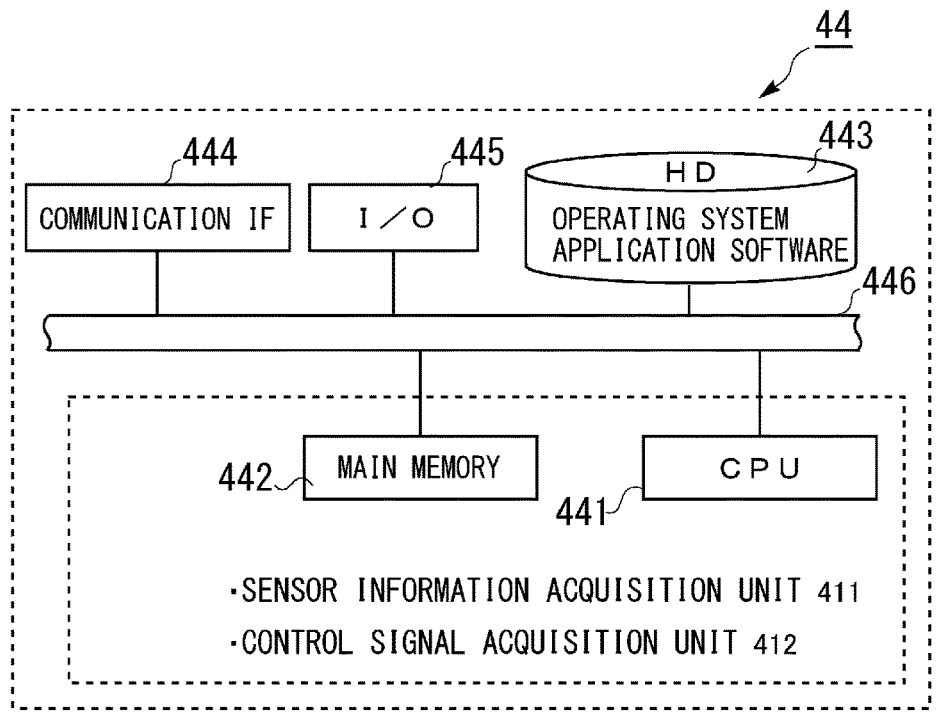
FIG. 9 is a diagram illustrating a configuration of a control device.

The control device 44 has a function of transmitting the information detected by the detection unit 46 to the management server 2 and a function of receiving control signals related to control of the door 9 from the management server 2. The control device 44 includes a CPU 441, a main memory 442, an auxiliary memory 443, a communication IF (Interface) 444, and input/output IF (Interface) 445, and a communication bus 446 as shown in FIG. 9, for example.

The CPU 441 performs processing described in the present embodiment by executing a program. For example, the CPU 441 provides functions of a sensor information acquisition unit 411 and a control signal acquisition unit 412.

The sensor information acquisition unit 411 acquires the detection result of the detection unit 46 at a prescribed timing as sensor information, and transmits to the management server 2 via a router unit 69 and the network 5. Note that identification information for allowing the management server 2 to identify each toilet cubicle is allotted to each of the toilet cubicle 14, and the sensor information acquisition unit 411 transmits the detection result along with the identification information.

The control signal acquisition unit 412 receives the control signals of the door 9 from the management server 2 via the network 5 and the router unit 69, and notifies control signals to the door drive unit 63 to control the door 9.

The main memory 442 is used for caching programs and data read out by the CPU 441 and for a work area of the CPU. Specifically, the main memory 442 is a RAM (Random Access Memory), a ROM (Read Only Memory), or the like.

The auxiliary memory 443 stores the programs to be executed by the CPU 441 as well as setting information and the like used in the present embodiment. Specifically, the auxiliary memory 443 is an HDD, an SSD, a flash memory, or the like.

The communication IF 444 transmits and receives data with other computer devices. Specifically, the communication IF 444 is a wired or wireless network card or the like. The input/output IF 445 is connected to an input/output device, accepts input from the user of the computer, and outputs information to the user. The input/output IF 445 according to the present embodiment has the controller 43 connected thereto as the input/output device, accepts input by the operation unit 431, outputs display on the display unit 432, and output sound from the speaker. The components descried above are connected via the communication bus 446. Note that a plurality of such components may be provided, or a part of the components may be omitted. For example, while the control device 44 may be provided for each toilet cubicle 14, it is also possible to employ a configuration in which a single control device is provided for a plurality of toilet cubicles 14, the states of the plurality of toilet cubicles 14 are acquired and transmitted to the management server 2 by the single control device, and the control signals for the plurality of toilet cubicles 14 are notified to the door drive units 63 of each of the toilet cubicles 14 by the single control device 44.

Figure 10:
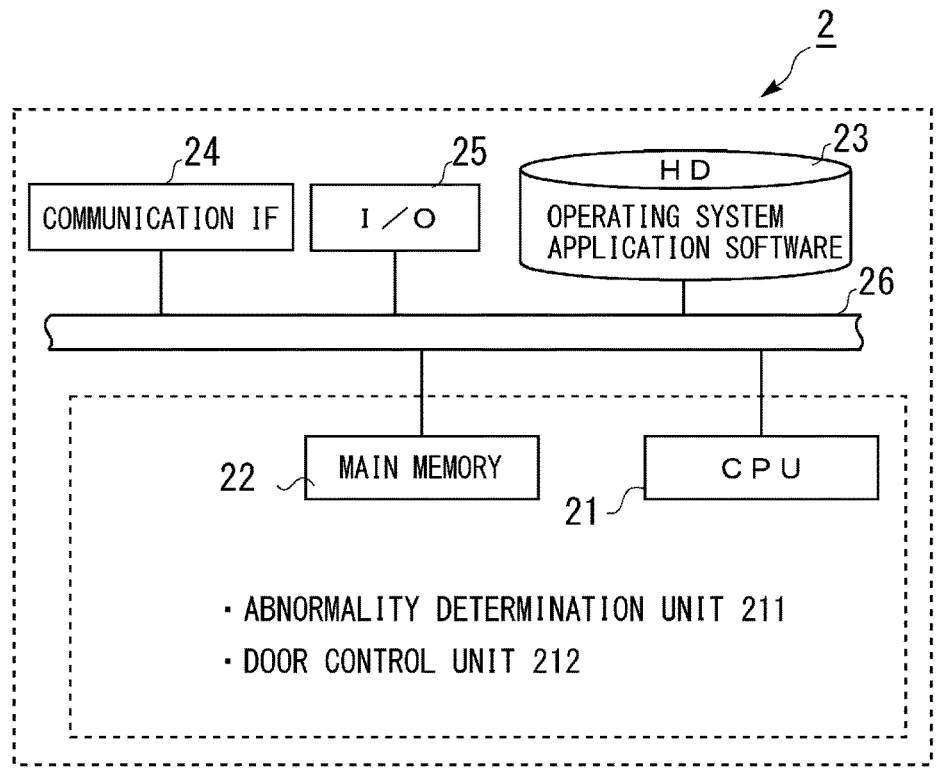
FIG. 10 is a diagram illustrating a configuration of a management server.

FIG. 10 is a diagram illustrating a hardware configuration of the management server 2. The management server 2 is a computer including a CPU 21, a main memory 22, an auxiliary memory 23, a communication IF (Interface) 24, an input/output IF (Interface) 25, and a communication bus 26.

The CPU 21 executes the programs decompressed to be executable on the main memory 22 to provide functions of an abnormality determination unit 211 and a door control unit 212.

The abnormality determination unit 211 determines the states of the toilet cubicles 14 acquired from the control device 44, i.e., determines occurrence of abnormality and type thereof based on the detection result of the detection unit 46. The abnormality determination unit 211 determines the type of abnormality based on which condition out of a plurality of conditions for determining occurrence of abnormality the detection result of the detection unit 46 satisfies. For example, when a first condition is satisfied, the abnormality determination unit 211 determines that falling down of the user has occurred. The first condition of the present example is that the maximum value of the height of the user detected by the detection unit 46 is a prescribed lower limit value or less or that the user has been still for a prescribed time or more.

In the example shown in FIG. 5, it is determined that the maximum value of the height of the user exceeds a prescribed lower limit value when the human-motion sensors 461 and 463 detect presence of the user, while it is determined that the maximum value of the height of the user is the prescribed lower limit value or less when the human-motion sensor 461 detects the presence of the user but the human-motion sensor 463 does not detect the presence of the user.

Further, when the human-motion sensors 461 and 463 detect the motions of the user and there is no motion detected for the prescribed time or more, it is determined that the user has been still for the prescribed time or more, i.e., the user is in an unmovable state.

Furthermore, the shapes of the articles inside the toilet cubicle are acquired by the three-dimensional scanner and the ToF distance image sensor, the user is identified therefrom by pattern matching, and height information of the user is acquired. When the maximum value of the height information at that time is the lower limit value H1 or smaller, it is determined that the user has fallen down. Further, when detection of the user is performed periodically by the three-dimensional sensor and the ToF distance image sensor and there is no change in the shape of the user for the prescribed time or more, it is determined that the user has been still for the prescribed time or more.

Further, the abnormality determination unit 211 determines that the user is an unlawful intruder, when the detection result of the detection unit 46 satisfies a second condition. The second condition of the present example is that the user is present over a prescribed upper limit value, that the user has changed the shape of the toilet equipment 1 provided inside the toilet cubicle, or that the user has done a specific action to the toilet equipment 1.

In the example of FIG. 5, it is determined that the user is present over the prescribed upper limit value when detecting the presence of the user by the human-motion sensor 462.

Further, the shapes of the toilet equipment 1 in the toilet cubicle in a normal state are acquired in advance by the three-dimensional scanner, the ToF distance image sensor, and the image recording unit 65, and the shapes are stored as reference patterns. Then, when the user enters the toilet cubicle, the shapes of the toilet equipment 1 are acquired in a prescribed period (1/30 seconds to 600 seconds, for example) by the three-dimensional scanner, the ToF distance image sensor, and the image recording unit 65, compared with the reference patterns, and it is determined that the user has changed the shapes of the toilet equipment 1, i.e., that the user has done an unlawful behavior such as destruction or dismantling, when there is a difference generated in the shapes of the toilet equipment 1 with respect to the reference patterns.

Further, the image in the toilet cubicle is acquired by the image recording unit 65, and a specific action of the user is detected by pattern recognition. For example, detected are a destructing action such as hitting the toilet equipment at a prescribed speed or more, an action of touching the toilet bowl or a sanitary napkin disposal receptacle with both hands, an action of giving an injection, an action of placing an article on a shelf, an action of taking off the cloths, and the like.

When detecting the actions of hitting the toilet equipment 1 at a prescribed speed or more, bringing fire of a lighter close to the toilet equipment 1, and scribbling or coloring the toilet equipment 1 with spray, the abnormality determination unit 211 determines that the second condition is satisfied considering that the user has done a specific action toward the toilet equipment 1.

Further, when detected by the detection unit 46 that the user has been touching the toilet bowl or the sanitary napkin disposal receptacle with both hands for a prescribed time T4 (1 minute, for example) or more and the user has not done an action of taking off the cloths after entering the cubicle, the abnormality determination unit 211 determines that the user has placed a sneaking camera or the like (specific action) in the toilet bowl or the sanitary napkin disposal receptacle (toilet equipment), i.e., that the second condition is satisfied. When disposing a sanitary napkin, the sanitary napkin is picked by a hand and inserted from an opening of the sanitary napkin disposal receptacle. Also, in a case of the sanitary napkin disposal receptacle with a lid, the lid is opened by a hand, the sanitary napkin is inserted by the other hand, and the lid is closed. Thus, there is no such action of touching the sanitary napkin disposal receptacle with both hands for a long time. In the meantime, when setting a sneaking camera, actions such as holding the camera by a hand and fixing by the other hand is carried out so that the hands are to be in touch with the toilet bowl or the sanitary napkin disposal receptacle for a relatively long time. Therefore, such actions are detected and determined as abnormal. Normally, there is no such situation that the hand is put deeply into the toilet bowl or the sanitary napkin disposal receptacle or the hand is in touch with the toilet bowl or the sanitary napkin disposal receptacle for a long time. Therefore, it is also possible to determine as abnormal when detecting a case where one hand is in touch for a prescribed time or more not only by both hands or a case of detecting an action of putting the hand into a deep side.

Further, when detecting an action of the user putting a syringe against the abdomen, thigh, or arm and an action of reaching the hand to the shelf or the sanitary napkin disposal receptacle immediately thereafter, the abnormality determination unit 211 determines as abnormal since there is a possibility that the needle of the syringe may be placed on the shelf or thrown into the sanitary napkin disposal receptacle. For example, there is no problem even when self-injection of insulin or self-injection of adrenalin is done in the toilet cubicle. However, other users may be injured when the needle used for the injection is left on the shelf or the sanitary napkin disposal receptacle, so that such action is detected as abnormal. In such case, it is difficult to detect the injection needle itself since the needle is thin and small, so that it is assumed that the injection needle is being left by detecting the action of the user handling the syringe.

Further, when the detection result of the detection unit 46 satisfies a third condition, the abnormality determination unit 211 determines that there is a remaining article in the toilet cubicle. The third condition of the present example is that, compared to the toilet cubicle before the user enters, an article that is not in the toilet cubicle before entering the toilet cubicle is present in the toilet cubicle after the user leaves.

For example, when comparing an image in the toilet cubicle 14 captured before the user enters with an image in the toilet cubicle 14 captured after the user leaves and an article that is not in the image before entering the toilet cubicle is in the image captured after leaving the toilet cubicle, it is determined that there is a remaining article, i.e., that the third condition is satisfied.

Further, the shapes of the articles in the toilet cubicle before the user enters and after the user leaves are acquired by the three-dimensional scanner and the ToF distance image sensor and compared, and it is determined that there is a remaining article when it is found that the number of articles is increased after leaving.

When it is determined by the abnormality determination unit 211 that abnormality has occurred, the door control unit 212 generates and transmits a control signal for opening or closing the door 9 to the control device 44 according to the type of the abnormality so as to control the door 9.

The main memory 22 is used for caching programs and data read out by the CPU 21 and for a work area of the CPU 21. Specifically, the main memory 22 is a RAM (Random Access Memory), a ROM (Read Only Memory), or the like.

The auxiliary memory 23 stores the programs executed by the CPU 21 as well as setting information and the like used in the present embodiment. Specifically, the auxiliary memory 23 is an HDD, an SSD, a flash memory, or the like.

The communication IF 24 transmits/receives data between with other computer devices. Specifically, the communication IF 24 is a wired or wireless network card or the like. The input/output IF 25 is connected to output means such as a display device and a printer, input means such as a keyboard and a pointing device, and input/output means such as a drive device as appropriate. The drive device is a reading/writing device of a removable memory medium, such as an input/output device of a flash memory card or a USB adaptor for connecting a USB memory. Further, the removable memory medium may be a disc medium such as a CD (Compact Disc) or a DVD (Digital Versatile Disk), for example. The drive device reads out programs from the removable memory media, and stores to the auxiliary memory 23.

The auxiliary memory 23 stores the programs executed by the CPU 21 as well as setting information and the like used in the present embodiment. Specifically, the auxiliary memory 23 is an HDD, an SSD, a flash memory, or the like. The auxiliary memory 23 exchanges data between with the drive device. For example, the auxiliary memory 23 stores the programs and the like installed from the drive device. Further, the auxiliary memory 23 reads out the programs and gives the programs to the main memory 22. Furthermore, the auxiliary memory 23 stores a condition table.

<Toilet Management Method>

Figure 11:
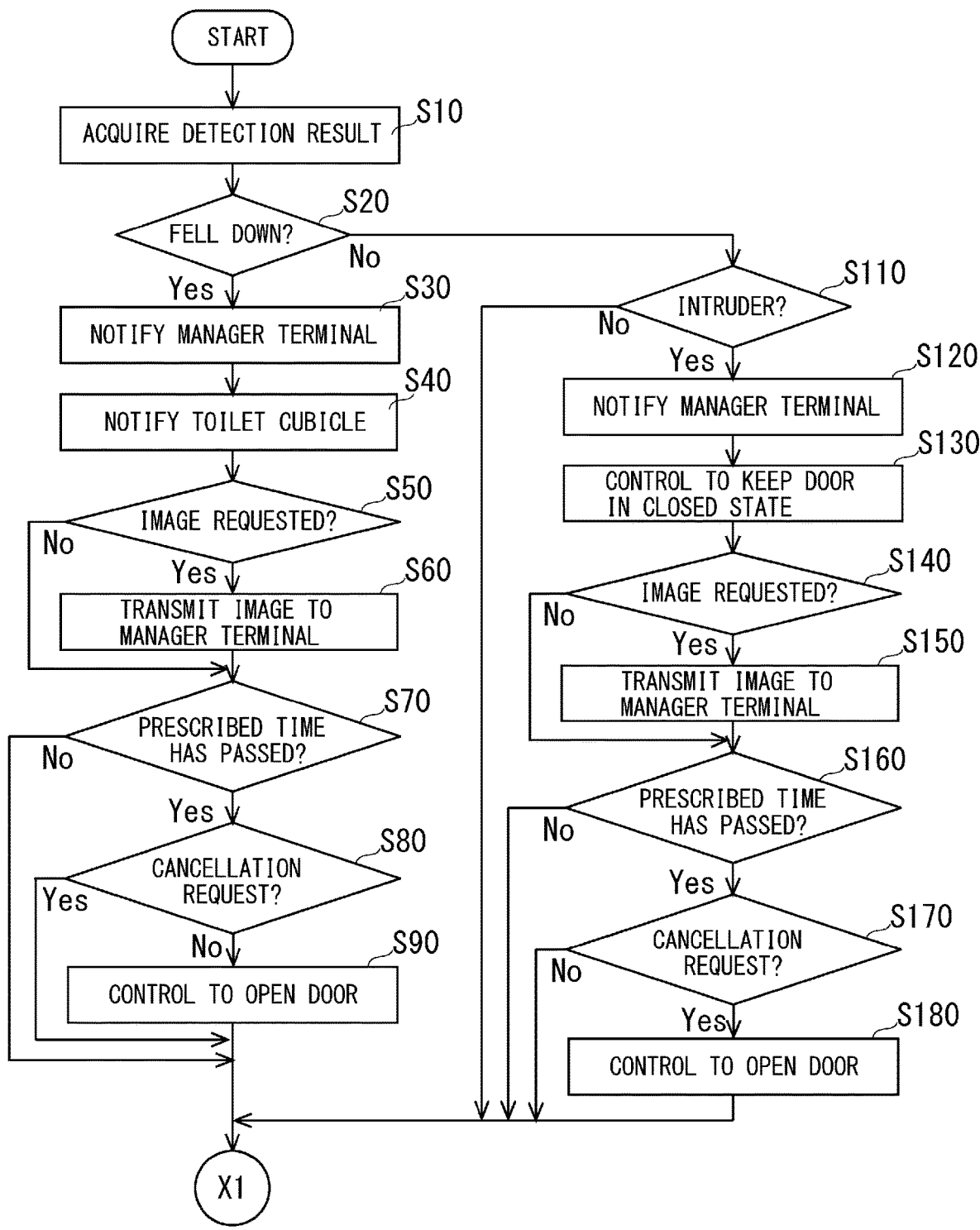
FIG. 11 is a flowchart for describing a toilet management method.
Figure 12:
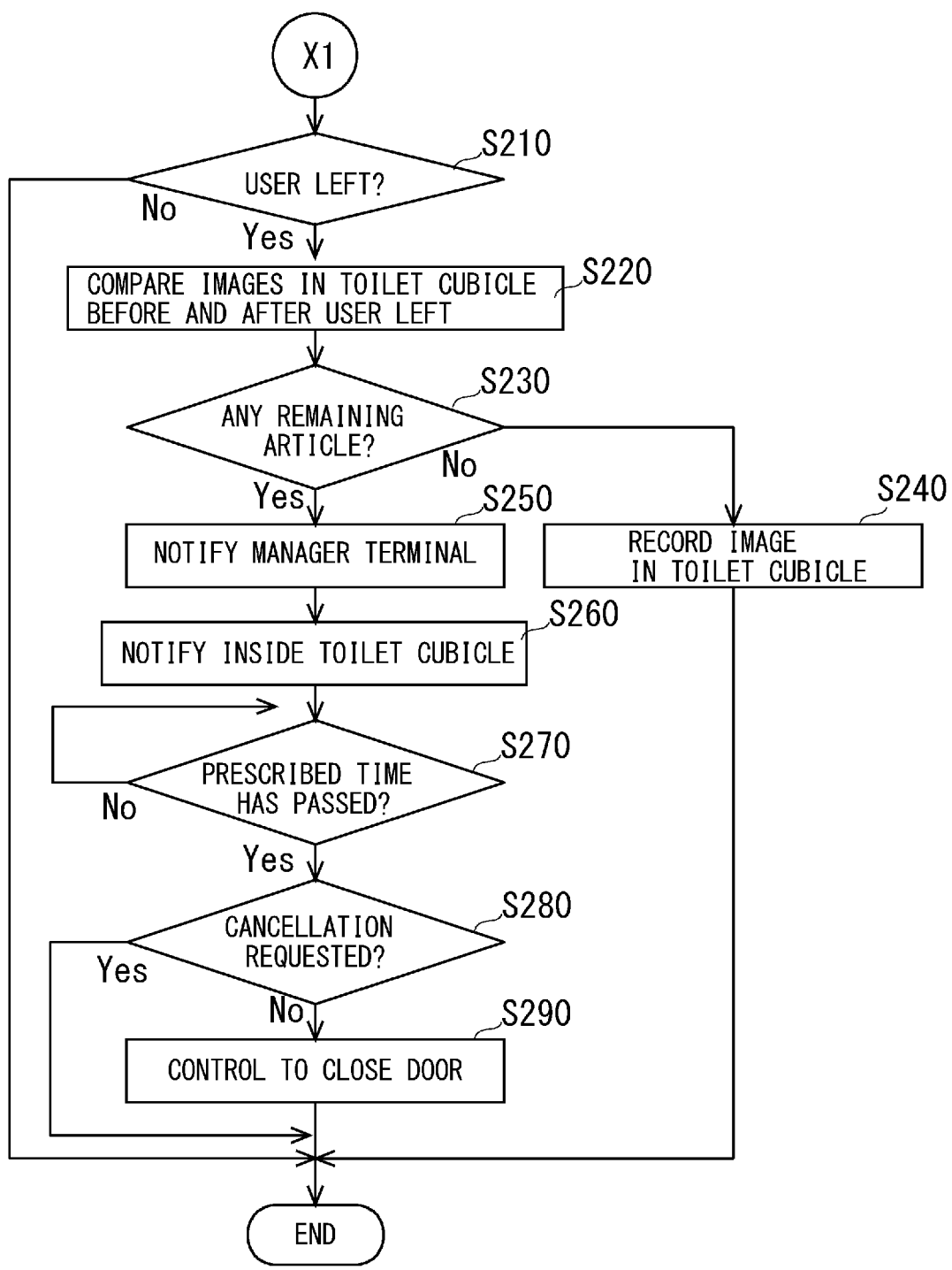
FIG. 12 is a flowchart for describing the toilet management method.

Next, a toilet management method of a toilet system according to the present embodiment will be described. FIG. 11 and FIG. 12 are flowcharts for describing the toilet management method executed by the management server 2 according to a toilet management program.

First, when the user enters the toilet cubicle 14 and the detection unit 46 detects the entry, the control device 44 transmits the identification information of the toilet cubicle 14 along with entrance time to the management server 2. Similarly, when the detection unit 46 detects leaving, the control device 44 also transmits the identification information of the toilet cubicle 14 along with information indicating the leaving to the management server 2. In the present embodiment, entry of the user to the toilet cubicle 14 is detected when any one of sensors 92, 421, 461, 462, and 463 is turned ON, and leaving of the user from the toilet cubicle 14 is detected when all the sensors are turned OFF.

Upon receiving the identification information of the toilet cubicle 14 and the entry time from the control device 44, the management server 2 executes processing of FIG. 11 and FIG. 12, and repeats the processing until receiving the information indicating leaving of the user from the toilet cubicle 14.

When the processing of FIG. 11 is started, the management server 2 requests the control device 44 of the toilet cubicle 14 identified by the received identification information to transmit the detection results of each of the sensors as user information so as to acquire the detection results from the control device 44, i.e., the state of the toilet cubicle 14 (step S10).

The management server 2 determines whether or not falling down of the user has occurred depending on whether or not the detection result satisfies the first condition (step S20).

When it is determined that falling down of the user has occurred (Yes in Step S20), the management server 2 transmits a mail to the manager terminal 3 for notifying occurrence of falling down (step S30). Further, the management server 2 notifies the occurrence of falling down to the control device 44, and outputs a message such as "Falling down is detected and notified to the manager. Please select "cancel" when no aid is necessary." by displaying on the display unit 432 of the controller 43 or by voice output from the speaker 433. Thereby, the user is notified that falling down has been reported and to do a cancelling operation when no aid is necessary.

Further, the management server 2 determines whether or not there is an image transmission request from the manager terminal 3. When there is an image transmission request from the manager terminal 3 (Yes in step S50), the image inside the toilet cubicle 14 captured by the image recording unit 65 is transmitted to the manager terminal 3 (step S60). In the meantime, when there is no image transmission request from the manager terminal 3 (No in step S50), the processing is shifted to step S70 without transmitting the image.

In step S70, the management server 2 determines whether or not a prescribed time has passed from a point in step S20 where it is determined that falling down initially occurred after the user entered the toilet cubicle 14. When it is determined that the prescribed time has not passed (No in step S70), the management server 2 shifts to step S210 of FIG. 12. When it is determined that the prescribed time has passed (Yes in step S70), the management server 2 determines whether or not there is a cancellation request received from the control device 44 or the manager terminal 3 (step S80). For example, when the user is not in a condition requiring an aid and selects cancellation by operating the controller 43, the control device 44 transmits to the management server 2 that the detection result indicating that cancellation of falling down is detected. Further, when it is determined that no aid is necessary as a result of checking the image, the manager inputs cancellation to the manager terminal 3 and the manager terminal 3 notifies cancellation to the management server 2.

When cancellation is requested from the manager terminal 3 or the control device 44 (Yes in step S80), the management server 2 shifts to step S210 of FIG. 12. When cancellation is not requested (No in step S80), the management server 2 transmits a control signal for opening the door 9 to the control device 44 to perform a control to open the door 9. This control for opening the door 9 may be a control to open the doorway 4 through moving the door 9 by the door drive unit 63 or may be a control for unlocking the lock 91 without moving the door 9. For example, in a case of a configuration where the door 9 can be opened manually by unlocking the lock 91, only unlocking of the lock 91 is done in step S90, and the manager opens the door manually when arriving at the toilet cubicle 14. Thereby, it is possible to inhibit unnecessary opening through closing the doorway 4 until the manager arrives after the control for opening the door 9 is done in step S90.

Further, in a case of a configuration where the door cannot be opened manually even the lock 91 is released, in step S90, the door 9 may be shifted by a prescribed amount toward an opening direction and set still with a prescribed space being left open for allowing the manager to operate the operation panel 61 by inserting a hand from the space when arriving at the toilet cubicle 14 to open the door.

In the meantime, when determined in step S20 that there is no falling down (No in step S20), the management server 2 determines whether or not the user is an unlawful intruder depending on whether or not the detection result satisfies the second condition (step S110). When determined as an unlawful intruder (Yes in step S110), the management server 2 transmits a mail to the manager terminal 3 for notifying presence of the intruder (step S120).

Then, the management server 2 transmits a control signal to the control device 44 to keep the door 9 in a closed state so as to control the door 9 and the lock 91 by the door drive unit 63 (step S130). The control for keeping the door 9 in a closed state is done by closing and locking the door 9 when the door 9 is in an open state. Even when an opening operation is done through the operation panel 61 in the locked state, such opening operation is not accepted and the door 9 is kept in a closed state.

Next, the management server 2 determines whether or not there is an image transmission request from the manager terminal 3 (step S140). When an image transmission request is received from the manager terminal 3 (Yes in step S140), the image inside the toilet cubicle 14 captured by the image recording unit 65 is transmitted to the manager terminal 3 (step S150). In the meantime, when there is no image transmission request from the manager terminal 3 (No in step S140), the processing is shifted to step S160 without transmitting the image.

In step S160, the management server 2 determines whether or not a prescribed time has passed from the point where it is determined in step S110 that there is presence of an unlawful intruder initially recognized after the user enters the toilet cubicle 14. When it is determined that the prescribed time has not passed (No in step S160), the management server 2 shifts to step S210 of FIG. 12. When it is determined that the prescribed time has passed (Yes in step S160), the management server 2 determines whether or not there is a cancellation request received from the manager terminal 3 (step S170). For example, when the manager determines as a result of checking the image that it is unnecessary to catch the intruder or when the manager arrives at the door 9 so that the door may be opened, the manager inputs cancellation to the manager terminal 3 and the manager terminal 3 notifies the management server 2 of cancellation.

When cancellation is not requested from the manager terminal 3 (No in step S170), the management server 2 shifts to step S210 of FIG. 12. When cancellation is requested (Yes in step S170), the management server 2 transmits a control signal to the control device 44 to terminate the control of keeping the door 9 in a closed state done in step S130 (step S180). Thereby, the control device 44 performs a control to do an action of opening the door 9 as usual when an opening operation is done through the operation panel 61. When the opened door 9 is closed at the time of executing step S130, it is possible to perform a control of moving the door 9 in an opening direction to be in a state before execution of step S130.

In step S210, the management server 2 determines whether or not the user has left the toilet cubicle 14 and, when not (No in step S210), ends the processing of FIG. 12. In the meantime, when the user has left the toilet cubicle 14 (Yes in step S210), the management server 2 acquires and compares the image inside the toilet cubicle 14 after the user left and the image inside the toilet cubicle 14 before the user entered (step S220).

Then, the management server 2 determines whether or not there is a remaining article depending on whether or not the comparison result satisfies the third condition (step S230). When it is determined that there is no remaining article (No in step S230), the management server 2 stores the image of the state after the user left acquired in step S220 (step S240) and ends the processing of FIG. 12. Note that the image stored in the memory is used when a next user enters the toilet cubicle and comparison of step S220 is to be done as the image before the user enters.

In the meantime, when it is determined that there is a remaining article (Yes in step S230), the management server 2 transmits a message for notifying presence of the remaining article and the image of the inside the toilet cubicle 14 captured by the image recording unit 65 to the manager terminal 3 by an e-mail (step S250). Further, the management server 2 notifies the control device 44 that there is the remaining article and to output a message such as "There is an article you may have left behind. Please select cancellation when you have retrieved the article." by displaying on the display unit 432 of the controller 43 or by voice output from the speaker 433. Thereby, the user is notified that there is the article left behind and to do a cancellation operation when the article left behind has been retrieved.

Then, the management server 2 determines whether or not a prescribed time has passed from the detection of the remaining article in step S230 (step S270). When the prescribed time has not passed (No in step S270), the management server 2 waits until the prescribed time passes. The prescribed time can be set arbitrarily. For example, the prescribed time is 30 to 120 seconds, and desirably 60 to 90 seconds.

Further, when it is determined that the prescribed time has passed (Yes in step S270), the management server 2 determines whether or not there is a cancellation request received from the control device 44 or the manager terminal 3 (step S280). For example, when the user retrieves the article left behind and inputs cancellation by operating the operation unit 431, the control device 44 transmits to the management server 2 the detection result indicating that the cancellation of the remaining article is detected. Further, when it is determined that it is unnecessary to close the door as a result of checking the image, the manager inputs cancellation to the manager terminal 3 and the manager terminal 3 notifies cancellation to the management server 2.

When there is the cancellation request from the manager terminal 3 or the control device 44 (Yes in step S280), the management server 2 ends the processing of FIG. 12 without performing a control of the door 9. When there is no cancellation request (No in step S280), the management server 2 transmits a control signal for closing the door 9 to the control device 44 to perform a control to close the door 9. The control device upon receiving the control signal for closing the door 9 moves the door 9 to close the doorway 4 by the door drive unit 63 and locks the door. Thereby, the control for closing the door 9 is performed when there is an article of the user left behind or there is a suspicious article present in the toilet cubicle 14.

<Effects of Embodiment>

With the present embodiment described above, the type of abnormality can be determined depending on which of the first to third conditions the detection result of the detection unit 46 satisfies, and the door of the toilet cubicle can be controlled according to the type of abnormality, i.e., according to the situation inside the toilet cubicle.

Further, the toilet system according to the present invention enables prompt aid of the user in the toilet cubicle by performing the control for opening the door 9, when the detection result satisfies the first condition and determined that falling down has occurred.

Further, the toilet system according to the present invention enables the control for keeping the door in a closed state for making the user stay in the toilet cubicle, when the detection result satisfies the second condition and determined that secret photographing or destruction of the toilet equipment 1 has occurred.

Further, the toilet system according to the present invention enables the control for closing the door, when the detection result satisfies the third condition and the remaining article is present in the toilet cubicle. Therefore, when the user leaves an article in the toilet cubicle, the article left behind can be prevented from being taken away by a third party through closing the door 9. Further, when there is a suspicious article left in the toilet cubicle, it is possible to prevent the next user from carelessly touching the suspicious article by closing the door 9.

<Others>

The present invention is not limited to the illustrative examples described above but various modifications are possible without departing from the scope and spirit of the present invention.

DESCRIPTION OF THE REFERENCE NUMERALS AND SYMBOLS

1 Toilet equipment
2 Management server
3 Manager terminal
5 Network
8 Guiderail
9 Door
10 Toilet facility
14 Toilet cubicle
22 Main memory
23 Auxiliary memory
26 Communication bus
41 Toilet bowl
42 Toilet seat device
43 Controller
44 Control device
46 Detection unit
61 Operation panel
63 Door drive unit
65 Image recording unit
69 Router unit

The invention claimed is:

1. A toilet system comprising a processor configured to:
  detect a state inside a toilet cubicle;
  determine an occurrence of an abnormality and a type thereof based on the detected state;
  in response to determining the occurrence of the abnormality, notify an administrator terminal of the occurrence of the abnormality;
  control opening and closing of a door in accordance with the type of abnormality in response to a cancellation request not having been received from the administrator terminal within a predetermined time after determining the occurrence of the abnormality; and
  not control the opening and closing of the door in response to the cancellation request having been received from the administrator terminal within the predetermined time after determining the occurrence of the abnormality.

2. The toilet system according to claim 1, wherein the processor is further configured to:
  detect a state of a user in the toilet cubicle based on a condition selected from the group consisting of position, shift, and shape of an article in the toilet cubicle;
  determine that there is the occurrence of the abnormality in response to the state of the user satisfying the condition; and
  in response to detecting the occurrence of the abnormality, perform a control to open the door.

3. The toilet system according to claim 2, wherein:
  the condition comprises at least one of: a maximum value of height of the user detected by the processor satisfies or is less than a lower limit value or that the user is inside the toilet cubicle for at least a threshold duration of time.

4. The toilet system according to claim 1, wherein the processor is further configured to:
  detect a state of a user in the toilet cubicle based on a condition selected from the group consisting of a position, shift, or shape of an article in the toilet cubicle;
  determine that there is the occurrence of the abnormality in response to the state of the user satisfying the condition; and
  in response to detecting the occurrence of the abnormality, keep the door in a closed state.

5. The toilet system according to claim 4 wherein:
  the condition comprises at least one of: the user is present inside the toilet cubicle over an upper limit value, shape of toilet equipment provided in the toilet cubicle is changed by the user, or that a specific action toward the toilet equipment is conducted by the user.

6. The toilet system according to claim 1, wherein the processor is further configured to:
  detect entry or exit of a user to/from the toilet cubicle;
  determine that there is the occurrence of the abnormality in response to comparing inside of the toilet cubicle before the user enters and inside of the toilet cubicle after the user leaves and determining that an article that was not present in the toilet cubicle before the entry is present in the toilet cubicle after the exit; and in response to determining occurrence of the abnormality, perform a control to close the door.

7. A toilet management method executed by a computer, the method comprising:
    detecting a state inside a toilet cubicle;
    determining an occurrence of an abnormality and a type thereof based on the detected state;
    in response to determining the occurrence of the abnormality, notifying an administrator terminal of the occurrence of the abnormality;
    controlling opening and closing of a door in accordance with the type of abnormality in response to a cancellation request not having been received from the administrator terminal within a predetermined time after determining the occurrence of the abnormality; and
    not controlling the opening and closing of the door in response to the cancellation request having been received from the administrator terminal within the predetermined time after determining the occurrence of the abnormality.

8. The method according to claim 7, further comprising:
    detecting a state of a user in the toilet cubicle based on a condition selected from the group consisting of position, shift, and shape of an article in the toilet cubicle;
    determining the occurrence of the abnormality in response to the state of the user satisfying the condition; and
    in response to detecting the occurrence of the abnormality, opening the door.

9. The method according to claim 7, further comprising:
    detecting a state of a user in the toilet cubicle based on a condition selected from the group consisting of a position, shift, or shape of an article in the toilet cubicle;
    determining the occurrence of the abnormality in response to the state of the user satisfying the condition; and
    in response to detecting the occurrence of the abnormality, keeping the door in a closed state.

10. The method according to claim 7, further comprising:
    detecting entry or exit of a user to/from the toilet cubicle;
    determining the occurrence of the abnormality in response to comparing inside of the toilet cubicle before the user enters and inside of the toilet cubicle after the user leaves and determining that an article that was not present in the toilet cubicle before the entry is present in the toilet cubicle after the exit; and
    in response to determining occurrence of the abnormality, closing the door.

11. A non-transitory readable-by-computer recording medium storing a toilet management program that, when executed by a computer, causes the computer to execute a method comprising:
    detecting a state inside a toilet cubicle;
    determining an occurrence of an abnormality and a type thereof based on the detected state;
    in response to determining the occurrence of the abnormality, notifying an administrator terminal of the occurrence of the abnormality;
    controlling opening and closing of a door in accordance with the type of abnormality in response to a cancellation request not having been received from the administrator terminal within a predetermined time after determining the occurrence of the abnormality; and
    not controlling the opening and closing of the door in response to the cancellation request having been received from the administrator terminal within the predetermined time after determining the occurrence of the abnormality.

12. The medium according to claim 11, wherein the method further comprises:
    detecting a state of a user in the toilet cubicle based on a condition selected from the group consisting of position, shift, and shape of an article in the toilet cubicle;
    determining the occurrence of the abnormality in response to the state of the user satisfying the condition; and
    in response to detecting the occurrence of the abnormality, opening the door.

13. The medium according to claim 12 wherein:
    the condition comprises at least one of: a maximum value of height of the user satisfying or being less than a lower limit value or that the user is inside the toilet cubicle for at least a threshold duration of time.

14. The method according to claim 12 wherein:
    the condition comprises at least one of: a maximum value of height of the user satisfying or being less than a lower limit value or that the user is inside the toilet cubicle for at least a threshold duration of time.

15. The medium according to claim 11, wherein the method further comprises:
    detecting a state of a user in the toilet cubicle based on a condition selected from the group consisting of a position, shift, or shape of an article in the toilet cubicle;
    determining the occurrence of the abnormality in response to the state of the user satisfying the condition; and
    in response to detecting the occurrence of the abnormality, keeping the door in a closed state.

16. The medium according to claim 15 wherein:
    the condition comprises at least one of: the user is present inside the toilet cubicle over an upper limit value, shape of toilet equipment provided in the toilet cubicle is changed by the user, or that a specific action toward the toilet equipment is conducted by the user.

17. The method according to claim 15 wherein:
    the condition comprises at least one of: the user is present inside the toilet cubicle over an upper limit value, shape of toilet equipment provided in the toilet cubicle is changed by the user, or that a specific action toward the toilet equipment is conducted by the user.

18. The medium according to claim 11, wherein the method further comprises:
    detecting entry or exit of a user to/from the toilet cubicle;
    determining the occurrence of the abnormality in response to comparing inside of the toilet cubicle before the user enters and inside of the toilet cubicle after the user leaves and determining that an article that was not present in the toilet cubicle before the entry is present in the toilet cubicle after the exit; and
    in response to determining occurrence of the abnormality, closing the door.

* * * * *

UNITED STATES PATENT AND TRADEMARK OFFICE
CERTIFICATE OF CORRECTION

| | |
|---|---|
| PATENT NO. | : 10,955,822 B2 |
| APPLICATION NO. | : 16/339870 |
| DATED | : March 23, 2021 |
| INVENTOR(S) | : Tomoei Kimura |

It is certified that error appears in the above-identified patent and that said Letters Patent is hereby corrected as shown below:

In the Claims

At Column 18, Line 23, In Claim 14, delete "claim 12" and insert --claim 8--.

At Column 18, Line 44, In Claim 17, delete "claim 15" and insert --claim 9--.

Signed and Sealed this
Seventeenth Day of January, 2023

Katherine Kelly Vidal
*Director of the United States Patent and Trademark Office*